US010277149B2

(12) United States Patent
Matsumoto (10) Patent No.: US 10,277,149 B2
(45) Date of Patent: Apr. 30, 2019

(54) AIR BLOWER EQUIPPED WITH BRUSHLESS DC MOTOR

(71) Applicant: Panasonic Intellectual Property Management Co., Ltd., Osaka (JP)

(72) Inventor: Toshihiro Matsumoto, Hyogo (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 0 days.

(21) Appl. No.: 15/920,574

(22) Filed: Mar. 14, 2018

(65) Prior Publication Data

US 2018/0205332 A1 Jul. 19, 2018

Related U.S. Application Data

(63) Continuation of application No. 14/414,167, filed as application No. PCT/JP2013/004335 on Jul. 16, 2013, now abandoned.

(30) Foreign Application Priority Data

Jul. 27, 2012 (JP) .................................. 2012-166776

(51) Int. Cl.
*H02P 6/08* (2016.01)
*H02P 6/28* (2016.01)
*F04D 27/00* (2006.01)
*H02P 6/14* (2016.01)

(52) U.S. Cl.
CPC .............. *H02P 6/14* (2013.01); *F04D 27/004* (2013.01); *H02P 6/085* (2013.01); *H02P 6/28* (2016.02)

(58) Field of Classification Search
None
See application file for complete search history.

(56) References Cited

U.S. PATENT DOCUMENTS

| 5,600,218 | A | * | 2/1997 | Holling ..................... H02P 6/18 318/400.04 |
| 5,821,713 | A |   | 10/1998 | Holling |
| 5,973,473 | A |   | 10/1999 | Anderson |
| 6,141,494 | A | * | 10/2000 | Nishino ................. B62D 5/046 318/432 |
| 7,560,895 | B2 |  | 7/2009 | Arnet |
| 7,631,537 | B2 |  | 12/2009 | Tada |
| 7,659,678 | B2 |  | 2/2010 | Maiocchi |
| 7,738,788 | B2 |  | 6/2010 | Suehiro |
| 8,094,481 | B2 |  | 1/2012 | Katoh |

(Continued)

FOREIGN PATENT DOCUMENTS

| JP | 2003047273 A | 2/2003 |
| JP | 2004201414 A | 7/2004 |
| JP | 2009209873 A | 9/2009 |

OTHER PUBLICATIONS

English translation of International Search Report for PCT/JP2013/004335, dated Aug. 27, 2013, 1 page.

*Primary Examiner* — Eduardo Colon Santana
*Assistant Examiner* — Said Bouziane
(74) *Attorney, Agent, or Firm* — RatnerPrestia (57) ABSTRACT

Air blower equipped with brushless DC motor includes an inverter circuit, a drive logic controller, a duty indicator, a motor voltage detector, a motor current detector, and a correlation detector. A duty indicating value of the duty indicator is determined according to a value of the correlation detector.

3 Claims, 6 Drawing Sheets

(56) References Cited

U.S. PATENT DOCUMENTS

| | | |
|---|---|---|
| 8,288,970 B2 | 10/2012 | Miller |
| 2002/0105293 A1 | 8/2002 | Harlan |
| 2004/0100216 A1 | 5/2004 | Makaran |
| 2004/0169482 A1 | 9/2004 | Maeda |
| 2008/0303464 A1 | 12/2008 | Takada |
| 2009/0067205 A1* | 3/2009 | Oyobe .................. B60K 6/445 363/98 |
| 2009/0289486 A1 | 11/2009 | Pino |
| 2010/0148710 A1 | 6/2010 | Lim |
| 2011/0000652 A1 | 1/2011 | Takada |
| 2011/0006715 A1 | 1/2011 | Sumita |
| 2014/0035502 A1 | 2/2014 | Wang |

* cited by examiner

PRIOR ART

FIG. 6

AIR BLOWER EQUIPPED WITH BRUSHLESS DC MOTOR

This application is a continuation of U.S. patent application Ser. No. 14/414,167, filed Jan. 12, 2015, which is a U.S. National Phase Application of PCT International Application PCT/JP2013/004335, filed Jul. 16, 2013, the contents of which are incorporated herein by reference.

TECHNICAL FIELD

The present invention relates to an air blower equipped with a brushless DC motor.

BACKGROUND ART

An air blower equipped with a brushless DC motor is used in, for example, a ventilator for exhaust of ceiling built-in type and the like, a ventilator for intake of ceiling built-in type and the like, an air blower, a humidifier, a dehumidifier, a refrigeration device, an air conditioner, and a water heater. In addition, in recent years, an air blower mounted on an electric device such as a ventilation device has been desired not to be affected by pressure loss due to ductwork form, outside wind pressure, and change of pressure loss due to the clogging of filter or the like. An air blower with good controllability, capable of ventilation with a constant air volume of optimum air volume depending on room conditions has been sought.

Conventionally, this kind of air blower has been known for the configuration disclosed in PTL 1. In the following, the conventional air blower will be described with reference to FIG. 6, which is a block diagram illustrating a configuration of a conventional air blower.

Figure 6:
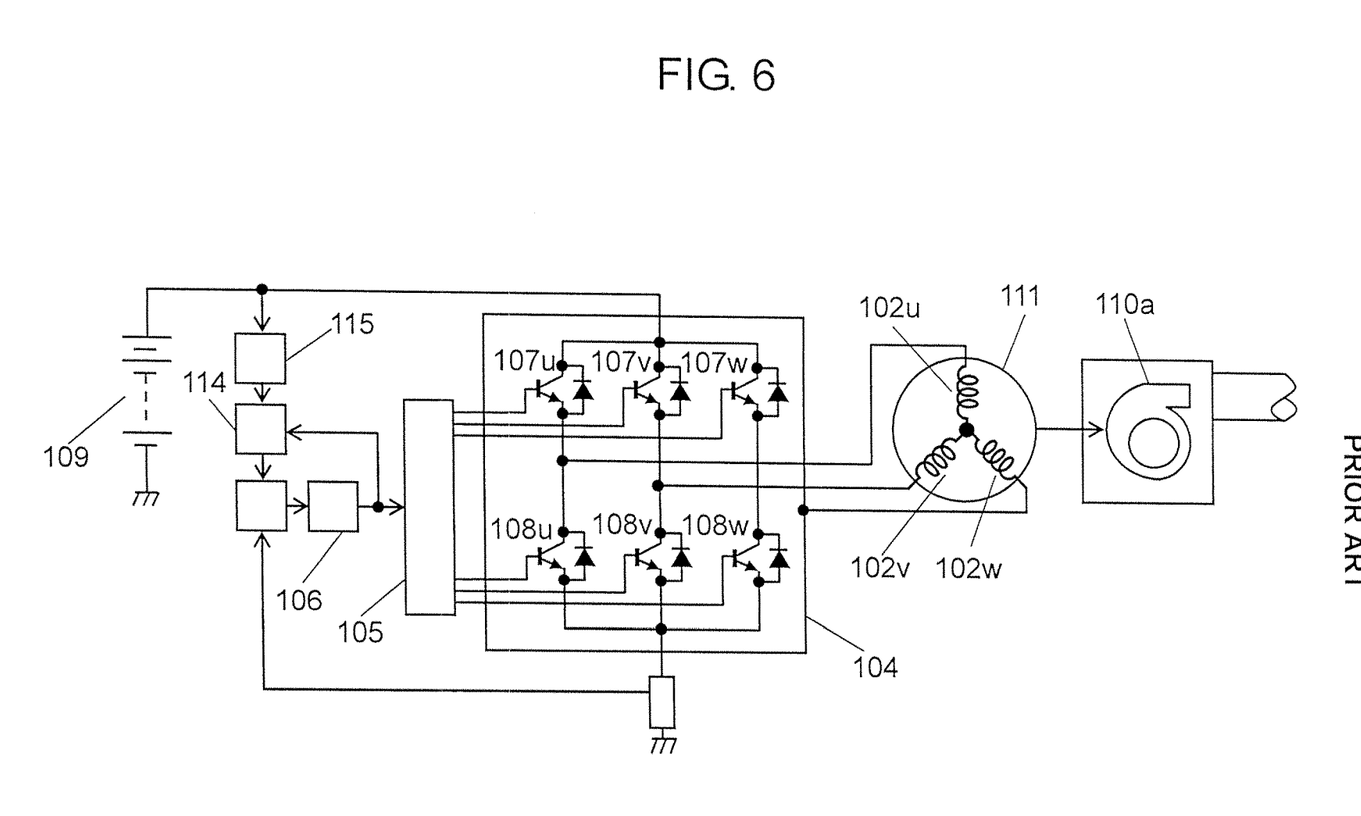
FIG. 6 is a block diagram illustrating a configuration of a conventional air blower.

As illustrated in FIG. 6, centrifugal type air blower 110a is equipped with brushless DC motor 111, and inverter circuit 104 includes an upper stage and a lower stage. In addition, centrifugal type blower 110a is driven by inverter circuit 104 including a bridge connection of upper stage side switching elements 107u, 107v, and 107w, and lower stage side switching elements 108u, 108v, and 108w. Applied voltage detector 115 detects the voltage value of DC power source 109 to be applied to inverter circuit 104.

Drive logic controller 105 performs PWM control of DC power supply 109 by upper stage side switching elements 107u, 107v, and 107w or lower stage side switching element 108u, 108v, and 108w. In addition, drive logic controller 105 energizes driving coils 102u, 102v, and 102w of brushless DC motor 111 in full wave sequentially in a specified direction and order.

Duty indicator 106 indicates the ON/OFF duty when performing PWM control of upper stage side switching elements 107u, 107v, and 107w or lower stage side switching elements 108u, 108v, and 108w. Equivalent voltage detector 114 detects the equivalent voltage applied to driving coils 102u, 102v, and 102w by multiplying the voltage value that is detected by applied voltage detector 115 by the ON/OFF duty indicated at duty indicator 106.

At the time of a predetermined voltage of an equivalent voltage detected by equivalent voltage detector 114, an output of duty indicator 106 is changed. Thereby, the ON/OFF duty of the PWM control becomes variable, and the average current supplied to inverter circuit 104 is controlled to a predetermined current value.

As a result, brushless DC motor 111 has the rotating speed-torque characteristic that the shaft torque is further increased along with the elevation of the rotating speed without being affected by variations in power supply voltage. Therefore, an air blower and an electrical device are available which have wind volume-static pressure characteristic that wind volume does not change significantly even when static pressure such as pressure loss changes.

In such a conventional brushless DC motor controller, the average current value supplied to inverter circuit 104 is determined from the equivalent voltage detected by equivalent voltage detector 114. The ON/OFF duty when performing PWM control is made variable so that the average current value is achieved. For this reason, there has been a problem that the motor current proportional to the generated torque of brushless DC motor 111 cannot be controlled, and that a deviation occurs also in the torque.

That is, even if an equivalent voltage being in a state where the voltage of DC power source 109 applied to inverter circuit 104 is large, and ON/OFF duty is small, and an applied voltage being in a state where the voltage of DC power source 109 is small, and ON/OFF duty is large, are equal to each other, the average current value supplied to inverter circuit 104 is different in each of the states. Therefore, there is a problem that a generated torque in brushless DC motor 111 also becomes different in each of the states.

CITATION LIST

Patent Literature

PTL 1: Unexamined Japanese Patent Publication No. 2009-209873

SUMMARY OF THE INVENTION

An air blower equipped with a brushless DC motor of the present invention includes an inverter circuit including a plurality of upper stage side switching elements and a plurality of lower stage side switching elements, the upper stage side switching elements and the lower stage side switching elements being connected in bridge. In addition, the air blower includes a drive logic controller configured to perform PWM control of the upper stage side switching elements or the lower stage side switching elements, and configured to control a DC voltage applied to the inverter circuit by energizing driving coils of the brushless DC motor sequentially in a specified direction and order. In addition, the air blower includes a duty indicator configured to indicate ON/OFF duty of the PWM control, a motor voltage detector configured to detect a voltage applied to the driving coils, and a motor current detector configured to detect a current flowing through the driving coils. Furthermore, the air blower includes a correlation detector configured to compare an output value of the motor voltage detector with an output value of the motor current detector. A duty indicating value of the duty indicator is then determined according to a value of the correlation detector.

The brushless DC motor determines the duty indicating value from the motor current proportional to the motor torque, and therefore, the current is directly detected without being affected by the voltage fluctuation of the DC power source. In addition, the rotating speed-torque characteristic that the shaft torque is further increased along with the elevation of the rotating speed of the brushless DC motor is obtained, and therefore, the wind volume-static pressure characteristic that the wind volume does not change significantly even when the static pressure such as the pressure loss changes is obtained. Therefore, the motor current proportional to the generated torque is not controlled, and deviation is not generated in the torque either. In addition, the generated torque is not different in each of the states either.

DESCRIPTION OF EMBODIMENT

In the following, an exemplary embodiment of the present invention will be described with reference to the drawings.

Exemplary Embodiment

Figure 1:
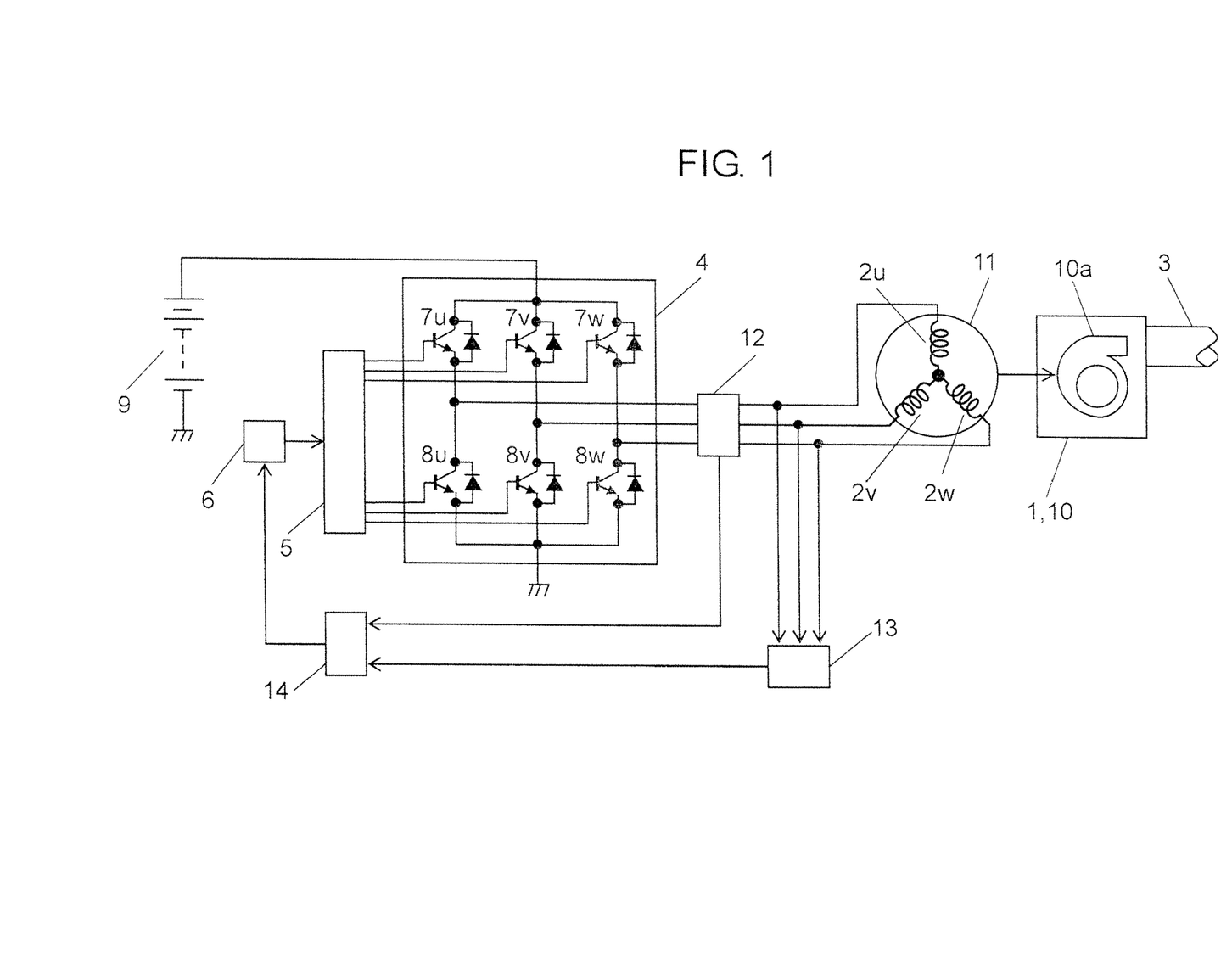
FIG. 1 is a block diagram illustrating a configuration of a ventilator incorporating an air blower in an exemplary embodiment of the present invention.
Figure 2A:
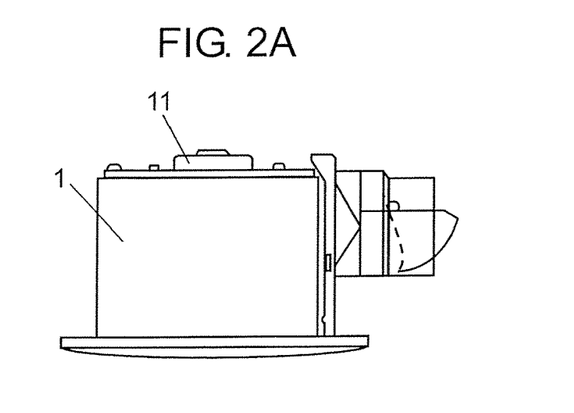
FIG. 2A is a front view of the ventilator equipped with the air blower.
Figure 2B:
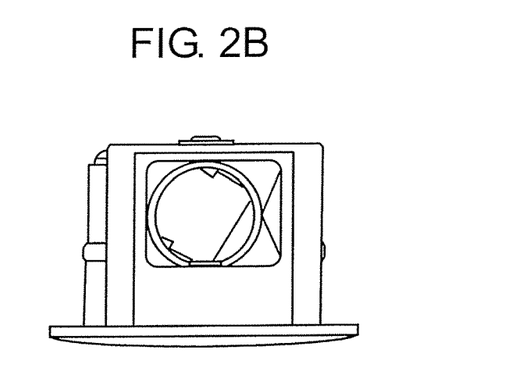
FIG. 2B is a side view of the ventilator equipped with the air blower.
Figure 2C:
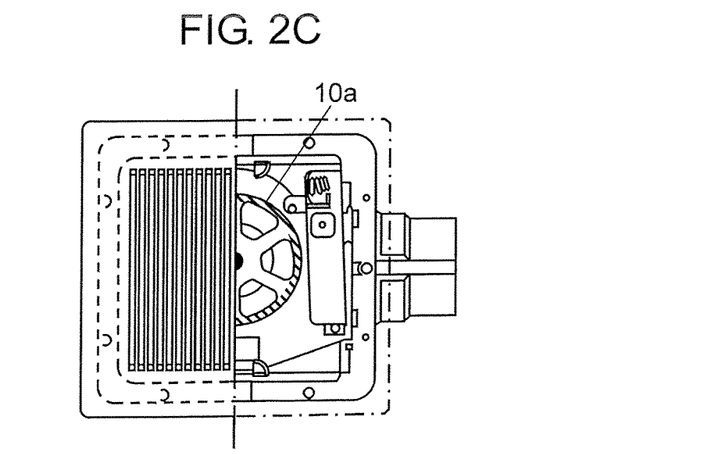
FIG. 2C is a view of the ventilator equipped with the air blower from below (right half is a view of the inside).

FIG. 1 is a block diagram illustrating a configuration of a ventilator incorporating an air blower in an exemplary embodiment of the present invention, FIG. 2A is a front view of the ventilator equipped with the air blower, FIG. 2B is a side view of the ventilator equipped with the air blower, and FIG. 2C is a view of the ventilator equipped with the air blower from below (right half is a view of the inside).

As illustrated in FIGS. 1, 2A to 2C, air blower 10 incorporates centrifugal type blower 10a equipped with brushless DC motor 11. Ventilator 1 incorporates air blower 10. Air blower 10 includes inverter circuit 4, drive logic controller 5, duty indicator 6, DC power source 9, motor current detector 12, motor voltage detector 13, and correlation detector 14.

Tobacco smoke or dirty indoor air generated by cooking and the like which are sucked by air blower 10 is discharged outside through a wall of a building via the discharge port of ventilator 1 and duct 3. Brushless DC motor 11 incorporates driving coils $2u$, $2v$, and $2w$. When driving coils $2u$, $2v$, and $2w$ are energized in a specified direction and order, brushless DC motor 11 rotates. These pieces of energization are performed by turning ON/OFF inverter circuit 4 based on the signal generated in drive logic controller 5. Inverter circuit 4 includes a plurality of upper stage side switching elements $7u$, $7v$, and $7w$, and a plurality of lower stage side switching elements $8u$, $8v$, and $8w$.

Based on the indicating voltage value of duty indicator 6, drive logic controller 5 controls the voltage supplied to brushless DC motor 11 by generating an ON/OFF interval of the PWM control. That is, duty indicator 6 indicates the ON/OFF duty of the PWM control.

In addition, drive logic controller 5 controls the rotation of brushless DC motor 11 by determining the direction and order of the energization. Based on the signal generated in drive logic controller 5, inverter circuit 4 is driven, which includes a bridge connection of upper stage side switching elements $7u$, $7v$, and $7w$ and lower stage side switching elements $8u$, $8v$, and $8w$. Drive logic controller 5 performs PWM control of upper stage side switching elements $7u$, $7v$, and $7w$ or lower stage side switching elements $8u$, $8v$, and $8w$. In addition, drive logic controller 5 controls the DC voltage applied to inverter circuit 4 by energizing driving coils $2u$, $2v$, and $2w$ sequentially in a specified direction and order.

Motor current detector 12 illustrated in FIG. 1 detects the sum of the absolute value of the currents flowing through driving coils $2u$, $2v$, and $2w$. Motor current detector 12 calculates an average value by integrating the detected current value, and normalizes the average value (normalized motor current value) by multiplying the average value by a predetermined coefficient so that the multiplication product can be compared with the motor voltage.

In addition, motor voltage detector 13 detects the voltages applied to driving coils $2u$, $2v$, and $2w$, specifically the average values of the instantaneous voltages. Motor voltage detector 13 then calculates an average value by integrating the average values of the detected instantaneous voltages, and normalizes the average value (normalized motor voltage value) by multiplying the average value by a predetermined coefficient so that the multiplication product can be compared with the motor current.

Correlation detector 14 compares the magnitude relation between the normalized motor current value which is the output value of motor current detector 12 and the normalized motor voltage value which is the output value of motor voltage detector 13. From correlation detector 14, Hi signal is output when the normalized motor current value is small, and Lo signal is output when the normalized motor current value is large. By integrating the output value of correlation detector 14, duty indicator 6 determines the duty indicating voltage value, which is the duty indicating value, to output the duty indicating voltage value. The duty indicating voltage value is then input to drive logic controller 5 again.

Figure 3A:
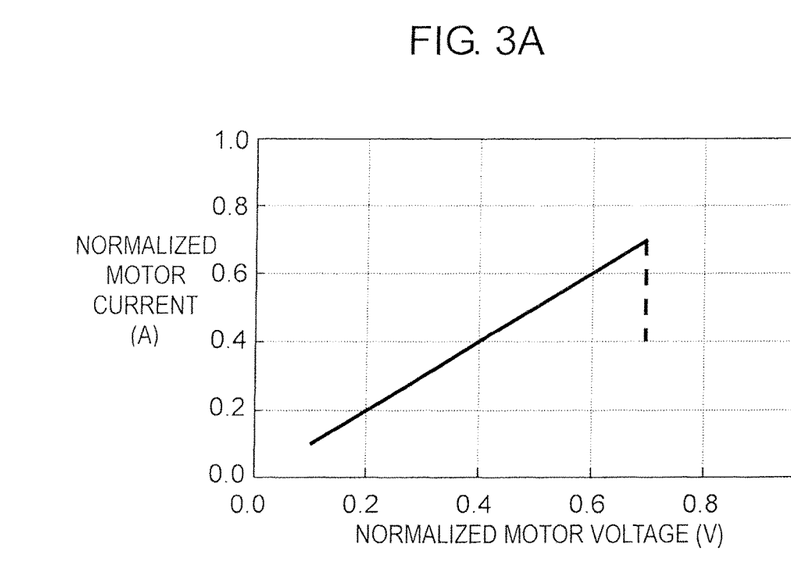
FIG. 3A is a graph illustrating a characteristic of a normalized motor voltage applied to the brushless DC motor of the air blower-a normalized motor current flowing through the brushless DC motor.

Next, the operation of controlling the motor current and the motor voltage of ventilator 1 will be described with reference to FIGS. 3A and 3B. FIG. 3A is a graph illustrating a characteristic of a normalized motor voltage applied to the brushless DC motor of an air blower in the exemplary embodiment of the present invention-a normalized motor current flowing through the brushless DC motor, and FIG. 3B is a graph illustrating a characteristic of a motor voltage applied to the brushless DC motor of the air blower-a motor current flowing through the brushless DC motor.

For example, when the normalized motor current value is larger than the normalized motor voltage value, in other words, when the normalized motor current value is above the upward sloping straight line in FIG. 3A, correlation detector 14 illustrated in FIG. 1 outputs a Lo signal. Then, the duty indicating voltage value of duty indicator 6 that integrates the Lo outputs decreases a little. By the duty indicating voltage value decreasing, the motor voltage also decreases a little. Furthermore, the motor output is lowered by the change of the motor voltage, and the motor current decreases greatly. This operation continues until the normalized motor current value and the normalized motor voltage value become equal, and ultimately converges on the upward sloping straight line in FIG. 3A.

Figure 3B:
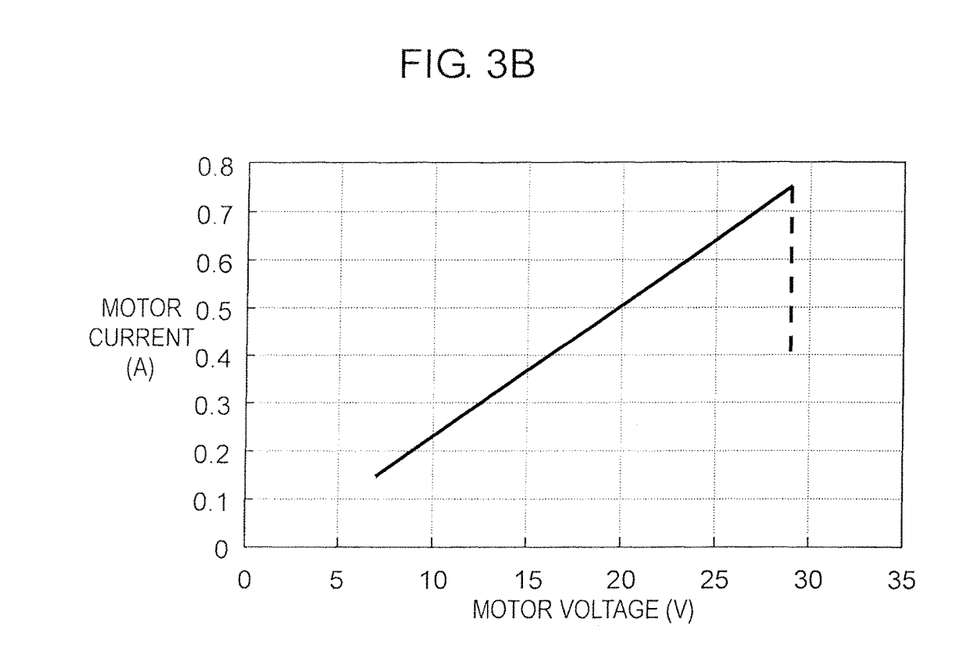
FIG. 3B is a graph illustrating a characteristic of a motor voltage applied to the brushless DC motor of the air blower-a motor current flowing through the brushless DC motor.

As a result, the normalized motor current value and the normalized motor voltage value are maintained in a state where they are equal to each other, the motor current and the motor voltage are maintained in a constant ratio, and the correlation illustrated in FIG. 3B is achieved. It should be noted that the broken line portions of the graphs in FIGS. 3A and 3B indicate the case of not using the control in the exemplary embodiment of the present invention.

In addition, the state where the motor current and the motor voltage are maintained in a constant ratio is not affected by the magnitude of the voltage of DC power source 109 which is applied to inverter circuit 104 illustrated in FIG. 6.

That is, when the voltage value of DC power source 109 applied to inverter circuit 104 is denoted as "power supply voltage", and the average current supplied to inverter circuit 104 is denoted as "power source current", then the following relations motor voltage=power supply voltage×ON/OFF duty motor current=power source current/ON/OFF duty are obtained. When a predetermined motor voltage is achieved in a state where the power supply voltage is small, and the ON/OFF duty is large, the power source current and the motor current are almost equal to each other because the ON/OFF duty is close to 1, and therefore, the motor current has been controlled even by a system of the conventional art for detecting the power source current. However, when a predetermined motor voltage is achieved in a state where the power supply voltage is large, and the ON/OFF duty is small, the power source current is extremely smaller than the motor current because the ON/OFF duty is close to 0, and therefore, the motor current has not been controlled by a system of the conventional art for detecting the power source current.

In the exemplary embodiment of the present invention, the motor current is accurately controlled without being affected by the magnitude of the power supply voltage, because the current flowing through the motor is directly detected.

Furthermore, motor voltage detector 13 illustrated in FIG. 1 detects the motor voltage accurately by detecting directly the voltages applied to driving coils $2u$, $2v$, and $2w$.

In FIG. 6 of the conventional art, the voltage value detected by applied voltage detector 115 is multiplied by the ON/OFF duty indicated at duty indicator 106, and an equivalent voltage applied to driving coils $102u$, $102v$, and $102w$ has been detected. However, in the conventional system, there is a problem that the equivalent voltage applied to driving coils $102u$, $102v$, and $102w$ is affected by the voltage drop of upper stage side switching elements $107u$, $107v$, $107w$ and lower stage side switching elements $108u$, $108v$, $108w$ of inverter circuit 104. In addition, there is also a problem that the equivalent voltage applied to driving coils $102u$, $102v$, and $102w$ is affected by the deviation between the ON/OFF duty indicated at duty indicator 106 and the ON/OFF duty that inverter circuit 104 actually applies to driving coils $102u$, $102v$, and $102w$.

In the exemplary embodiment of the present invention, the motor voltage is detected accurately because the voltages applied to driving coils $2u$, $2v$, and $2w$ are detected directly.

According to such a brushless DC motor in the exemplary embodiment of the present invention, the voltage supplied from inverter circuit 4 to brushless DC motor 11 is controlled so that the output value of motor current detector 12 and the output value of motor voltage detector 13 are maintained in a constant ratio.

By this control, as illustrated in FIGS. 3A and 3B, the voltage and the current of brushless DC motor 11 are maintained in a constant ratio. In this state, when the rotating speed of brushless DC motor 11 becomes higher, the motor current also increases, and inversely when the rotating speed of brushless DC motor 11 becomes lower, the motor current also decreases.

Figure 4:
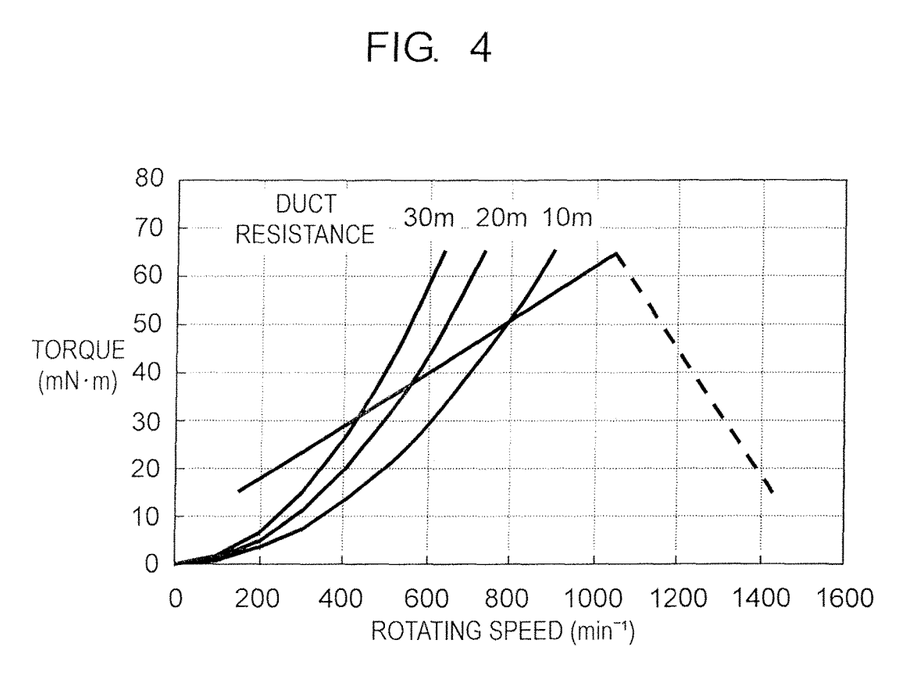
FIG. 4 is a graph illustrating the rotating speed-torque characteristic of the brushless DC motor of the air blower.

FIG. 4 is a graph illustrating the rotating speed-torque characteristic of the brushless DC motor of the air blower in the exemplary embodiment of the present invention. The motor current and the torque are proportional to each other. In addition, the voltage and the current of brushless DC motor 11 described above are maintained in a constant ratio. For this reason, the rotating speed-torque characteristic of brushless DC motor 11 is that the shaft torque increases as the rotating speed increases, as illustrated in the upward sloping straight line of FIG. 4. This characteristic is not changed even when the duct resistance is changed by the duct length being changed to 10 m, 20 m, and 30 m.

It should be noted that the broken line portion of the graph in FIG. 4 illustrates the case of not using the control in the exemplary embodiment of the present invention.

Figure 5:
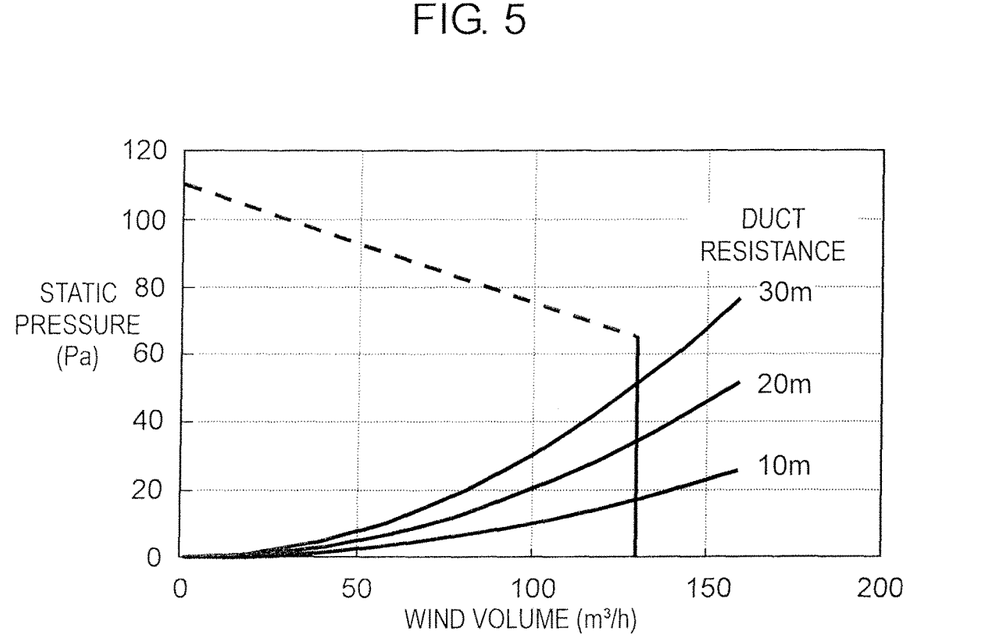
FIG. 5 is a graph illustrating the wind volume-static pressure characteristic of the ventilator equipped with the air blower.

FIG. 5 is a graph illustrating the wind volume-static pressure characteristic of the ventilator equipped with the air blower in the exemplary embodiment of the present invention. In addition, by the characteristic illustrated in FIG. 4, in ventilator 1 equipped with air blower 10 illustrated in FIG. 1, the wind volume-static pressure characteristic can be obtained that the wind volume does not change significantly even when the static pressure (pressure loss) such as the external wind pressure and the duct length (10 m, 20 m, and 30 m) is changed. That is, as illustrated in FIG. 5, when the static pressure is 65 Pa or less, a straight line is obtained where the wind volume is constant at 130 m³/h.

It should be noted that the broken line portion of the graph in FIG. 5 illustrates the case of not using the control in the exemplary embodiment of the present invention.

It should be noted that inverter circuit 4 is assumed to include a three-phase full-wave configuration in the exemplary embodiment of the present invention, but that the same effect can be obtained also by a single-phase full-wave configuration.

It should be noted that the exemplary embodiment of the present invention cannot be applied to the energization systems of two-phase modulation energization and three-phase modulation energization.

In addition, in the exemplary embodiment of the present invention, motor voltage detector 13 illustrated in FIG. 1 is configured to detect the average value of the voltages applied to driving coils $2u$, $2v$, and $2w$. However, if a motor voltage detector is configured to detect the integrated value of the voltage difference between a driving coil with the maximum value and a driving coil with the minimum value among the voltages applied to driving coils $2u$, $2v$, and $2w$, even when non-energized interval exists in part of the driving coils such as in 120-degree square wave energization, the same effect can be obtained.

In addition, in the exemplary embodiment of the present invention, motor current detector 12 illustrated in FIG. 1 is configured to detect the average value of the sum of the absolute values of the currents flowing through driving coils $2u$, $2v$, and $2w$. However, motor current detector 12 may be configured to detect an equivalent motor current by dividing the average value of the current flowing through inverter circuit 4 by the output value of duty indicator 6. That is, in place of motor current detector 12, a circuit current detector configured to detect the current of inverter circuit 4 may be included. In addition, motor current detector 12 may be configured to detect an equivalent motor current by holding the peak of the maximum value of the current flowing through inverter circuit 4.

INDUSTRIAL APPLICABILITY

An air blower equipped with a brushless DC motor of the present invention is useful as an air blower used in a ventilator and the like for exhaust and intake of ceiling built-in type and the like, and as an electric device and the like.

REFERENCE MARKS IN THE DRAWINGS 1 ventilator
2u, 2v, 2w driving coil
3 duct
4 inverter circuit
5 drive logic controller
6 duty indicator
7u, 7v, 7w upper stage side switching element
8u, 8v, 8w lower stage side switching element
10 air blower
10a centrifugal blower
11 brushless DC motor
12 motor current detector
13 motor voltage detector
14 correlation detector

The invention claimed is:

1. An air blower equipped with a brushless DC motor comprising:
an inverter circuit including a plurality of upper stage side switching elements and a plurality of lower stage side switching elements connected to form a bridge;
a drive logic controller configured to perform PWM control of the upper stage side switching elements or the lower stage side switching elements, and control a DC voltage applied to the inverter circuit by energizing driving coils of the brushless DC motor sequentially in a specified direction and order;
a duty indicator configured to indicate ON/OFF duty of the PWM control;
a motor voltage detector configured to detect a voltage applied to the driving coils, and output a normalized motor voltage value, the normalized motor voltage value being obtained by normalizing treatment of the detected voltage;
a motor current detector configured to detect a current flowing through the driving coils, and output a normalized motor current value, the normalized motor current value being obtained by normalizing treatment of the detected current; and
a correlation detector configured to compare the normalized motor voltage value with the normalized motor current value, generate a control signal based on the comparison, and output the control signal to the duty indicator, the control signal changing the ON/OFF duty of the PWM control;
wherein
the correlation detector is configured to decrease the ON/OFF duty of the control signal when the normalized motor current value is larger than the normalized motor voltage value according to the comparison, and increase the ON/OFF duty of the control signal when the normalized motor voltage value is larger than the normalized motor current value, to maintain the normalized motor current value and the normalized motor voltage value to be equal to each other, when a graph is illustrated with the normalized motor voltage value on a horizontal axis and the normalized motor current value on a vertical axis,
wherein the voltage detected by the motor voltage detector is an average value of an instantaneous voltage applied to the driving coils, and
the motor voltage detector is configured to calculate an average voltage value by integrating the average value, normalize the average voltage value by multiplying the average voltage value with a predetermined coefficient.

2. An air blower equipped with a brushless DC motor comprising:
an inverter circuit including a plurality of upper stage side switching elements and a plurality of lower stage side switching elements connected to form a bridge;
a drive logic controller configured to perform PWM control of the upper stage side switching elements or the lower stage side switching elements, and control a DC voltage applied to the inverter circuit by energizing driving coils of the brushless DC motor sequentially in a specified direction and order;
a duty indicator configured to indicate ON/OFF duty of the PWM control;
a motor voltage detector configured to detect a voltage applied to the driving coils, and output a normalized motor voltage value, the normalized motor voltage value being obtained by normalizing treatment of the detected voltage;
a motor current detector configured to detect a current flowing through the driving coils, and output a normalized motor current value, the normalized motor current value being obtained by normalizing treatment of the detected current; and
a correlation detector configured to compare the normalized motor voltage value with the normalized motor current value, generate a control signal based on the comparison, and output the control signal to the duty indicator, the control signal changing the ON/OFF duty of the PWM control;
wherein
the correlation detector is configured to decrease the ON/OFF duty of the control signal when the normalized motor current value is larger than the normalized motor voltage value according to the comparison, and increase the ON/OFF duty of the control signal when the normalized motor voltage value is larger than the normalized motor current value, to maintain the normalized motor current value and the normalized motor voltage value to be equal to each other, when a graph is illustrated with the normalized motor voltage value on a horizontal axis and the normalized motor current value on a vertical axis,
wherein the current detected by the current detector is a sum of an absolute value of the current flowing through the driving coils, and
the motor current detector is configured to calculate an average value by integrating the sum of the absolute value, normalize the average value by multiplying the average value with a predetermined coefficient.

3. An air blower equipped with a brushless DC motor comprising:

an inverter circuit including a plurality of upper stage side switching elements and a plurality of lower stage side switching elements connected to form a bridge;

a drive logic controller configured to perform PWM control of the upper stage side switching elements or the lower stage side switching elements, and control a DC voltage applied to the inverter circuit by energizing driving coils of the brushless DC motor sequentially in a specified direction and order;

a duty indicator configured to indicate ON/OFF duty of the PWM control;

a motor voltage detector configured to detect a voltage applied to the driving coils, and output a normalized motor voltage value, the normalized motor voltage value being obtained by normalizing treatment of the detected voltage;

a motor current detector configured to detect a current flowing through the driving coils, and output a normalized motor current value, the normalized motor current value being obtained by normalizing treatment of the detected current; and a correlation detector configured to compare the normalized motor voltage value with the normalized motor current value, generate a control signal based on the comparison, and output the control signal to the duty indicator, the control signal changing the ON/OFF duty of the PWM control;

wherein
the correlation detector is configured to decrease the ON/OFF duty of the control signal when the normalized motor current value is larger than the normalized motor voltage value according to the comparison, and increase the ON/OFF duty of the control signal when the normalized motor voltage value is larger than the normalized motor current value, to maintain the normalized motor current value and the normalized motor voltage value to be equal to each other, when a graph is illustrated with the normalized motor voltage value on a horizontal axis and the normalized motor current value on a vertical axis, wherein the voltage detected by the motor voltage detector is an integrated value of a voltage difference between a maximum voltage and a minimum voltage among the voltage applied to the coils, and the motor voltage detector is configured to calculate an average value of the integrated value of the voltage difference between the driving coils, normalize the average value of the voltage difference by multiplying the average value with a predetermined coefficient.

* * * * *